(12) United States Patent
Campney et al.

(10) Patent No.: US 9,043,003 B2
(45) Date of Patent: May 26, 2015

(54) GRAPHICAL VIEW SIDEBAR FOR A PROCESS CONTROL SYSTEM

(75) Inventors: Bruce H. Campney, Pflugerville, TX (US); Trevor D. Schleiss, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 975 days.

(21) Appl. No.: 12/533,526

(22) Filed: Jul. 31, 2009

(65) Prior Publication Data

US 2011/0029102 A1 Feb. 3, 2011

(51) Int. Cl.
*G05B 15/02* (2006.01)
*G05B 23/02* (2006.01)
*G05B 17/02* (2006.01)

(52) U.S. Cl.
CPC ............ *G05B 23/0267* (2013.01); *G05B 15/02* (2013.01); *G05B 17/02* (2013.01)

(58) Field of Classification Search
USPC ........ 700/83, 19; 715/866, 771, 965; 726/4, 5
See application file for complete search history.

(56) References Cited

U.S. PATENT DOCUMENTS

| | | | |
|---|---|---|---|
| 5,631,825 A * | 5/1997 | van Weele et al. ............... | 700/83 |
| 7,092,771 B2 * | 8/2006 | Retlich et al. .................... | 700/72 |
| 7,221,988 B2 * | 5/2007 | Eryurek et al. ................ | 700/108 |
| 7,738,973 B2 * | 6/2010 | McGreevy et al. ............. | 700/17 |
| 7,962,229 B2 * | 6/2011 | Bromley et al. ................ | 700/83 |
| 8,000,814 B2 * | 8/2011 | Havekost et al. ............... | 700/17 |
| 8,117,554 B1 * | 2/2012 | Grechishkin et al. ......... | 715/764 |
| 8,125,310 B2 * | 2/2012 | Enkerud et al. ............... | 340/3.71 |
| 8,185,219 B2 | 5/2012 | Gilbert et al. | |
| 8,370,224 B2 * | 2/2013 | Grewal ........................... | 705/29 |
| 8,392,845 B2 * | 3/2013 | Cahill et al. ................... | 715/771 |
| 8,407,716 B2 * | 3/2013 | Nixon et al. ................... | 719/312 |
| 2003/0028269 A1 * | 2/2003 | Spriggs et al. .................. | 700/83 |

(Continued)

FOREIGN PATENT DOCUMENTS

CN 1680894 A 10/2005
EP 0 813 129 A2 12/1997

(Continued)

OTHER PUBLICATIONS

Siemens Simatic 7 PCS Process Control System Brochure Answers for Industry br_pcs7_v71_en Mar. 2009.*

(Continued)

*Primary Examiner* — Ryan Jarrett
(74) *Attorney, Agent, or Firm* — Marshall, Gerstein & Borun LLP

(57) ABSTRACT

A secondary or "sidebar" display within a process control environment may provide several small applications to allow business managers, engineers, maintenance personnel, or other non-operator personnel to organize and manage process control system information and to display selected diagnostics and summary information or "key operating parameters" for the process control system. Further, sidebar applications may communicate with other applications that are executing on a non-operator user's workstation to, thereby, retrieve information related to tasks that the user is currently completing. The sidebar application may then determine whether certain process control information may be useful for the main task the user is completing and display that process control information within the sidebar.

21 Claims, 10 Drawing Sheets

(56) References Cited

U.S. PATENT DOCUMENTS

| | | | |
|---|---|---|---|
| 2003/0202645 A1* | 10/2003 | Naik et al. | 379/201.1 |
| 2004/0189713 A1* | 9/2004 | Thames et al. | 345/810 |
| 2006/0031787 A1* | 2/2006 | Ananth et al. | 715/967 |
| 2006/0107231 A1* | 5/2006 | Matthews et al. | 715/788 |
| 2006/0168536 A1* | 7/2006 | Portmann | 715/762 |
| 2007/0043839 A1 | 2/2007 | Amadio et al. | |
| 2007/0083813 A1* | 4/2007 | Lui et al. | 715/709 |
| 2007/0130541 A1* | 6/2007 | Louch et al. | 715/804 |
| 2007/0135944 A1* | 6/2007 | Schmid et al. | 700/83 |
| 2007/0150081 A1* | 6/2007 | Nixon et al. | 700/83 |
| 2007/0179641 A1* | 8/2007 | Lucas et al. | 700/83 |
| 2007/0260982 A1* | 11/2007 | Wayland et al. | 715/700 |
| 2008/0066004 A1* | 3/2008 | Blevins et al. | 715/771 |
| 2008/0126958 A1* | 5/2008 | Louie | 715/764 |
| 2008/0163096 A1 | 7/2008 | Pannese et al. | |
| 2008/0244449 A1* | 10/2008 | Morrison et al. | 715/810 |
| 2008/0256478 A1* | 10/2008 | Bromley et al. | 715/772 |
| 2008/0300698 A1* | 12/2008 | Havekost et al. | 700/83 |
| 2009/0089682 A1* | 4/2009 | Baier et al. | 715/751 |
| 2009/0157200 A1* | 6/2009 | Hams | 700/83 |
| 2009/0210814 A1* | 8/2009 | Agrusa et al. | 715/772 |
| 2010/0023874 A1* | 1/2010 | Frohwein | 715/747 |
| 2010/0050103 A1* | 2/2010 | Husoy et al. | 715/765 |
| 2010/0125534 A1* | 5/2010 | Brandes et al. | 705/36 R |
| 2010/0271479 A1* | 10/2010 | Heydlauf | 348/143 |
| 2011/0093098 A1* | 4/2011 | Kostadinov et al. | 700/87 |

FOREIGN PATENT DOCUMENTS

| | | | |
|---|---|---|---|
| GB | 2 468 753 A | | 9/2010 |
| GB | 2 469 905 A | | 11/2010 |
| JP | 2007-536648 A | | 12/2007 |
| WO | WO-2005/101196 A2 | | 10/2005 |
| WO | PCT/EP2008/051647 | * | 9/2008 |
| WO | WO 2010/037146 A2 | | 4/2010 |

OTHER PUBLICATIONS

Search Report for Application No. GB1012725.6, dated Nov. 26, 2010.
Office Action Dated Jan. 24, 2013 for Chinese Patent Application No. 201010242844.9, 7 pgs.
Second Office Action for Chinese Application No. 201010242844.9, dated Sep. 4, 2013.
Third Office Action for Chinese Application No. 201010242844.9, dated Dec. 5, 2013.
Notice of Reasons for Rejection for Japanese Application No. 2010-166897, dated Apr. 8, 2014.
Fourth Office Action for Chinese Application No. 201010242844.9, dated Mar. 5, 2014.
Rejection Decision for Chinese Application No. 201010242844.9, dated Jun. 25, 2014.
Examination Report for Application No. GB1012725.6, dated Mar. 9, 2015.

* cited by examiner

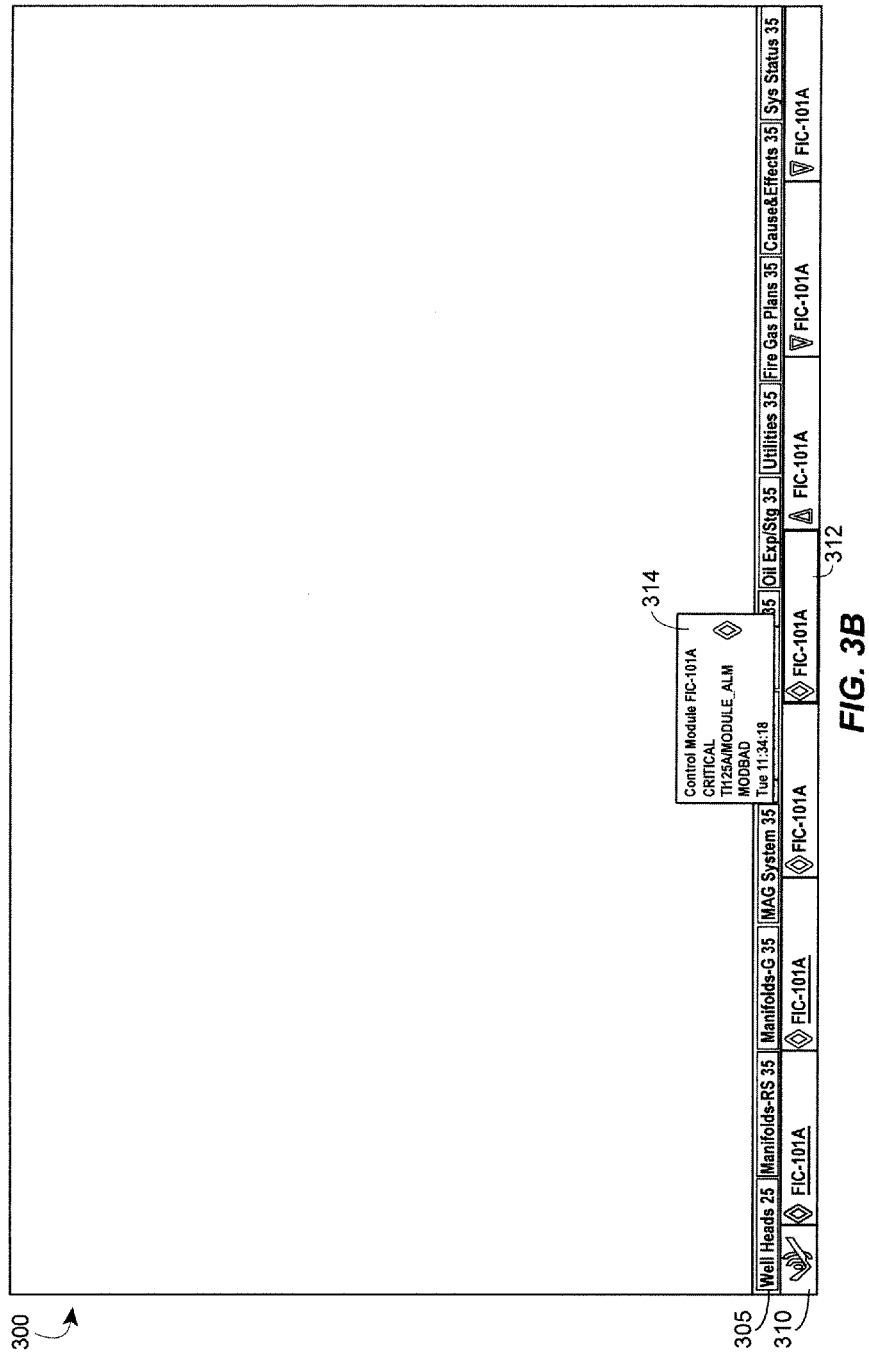

GRAPHICAL VIEW SIDEBAR FOR A PROCESS CONTROL SYSTEM

TECHNICAL FIELD

The present invention relates generally to process plants and, more particularly, to an interface for conveying a situational awareness of various activities associated with plant configuration, engineering, control, maintenance, and simulation to system personnel that are above the level of operator.

DESCRIPTION OF THE RELATED ART

Distributed process control systems, like those used in chemical, petroleum or other processes, typically include one or more process controllers communicatively coupled to one or more field devices via analog, digital or combined analog and digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocols, like the FOUNDATION™ Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being executed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process system that may be networked across several facilities or process control plants. A configuration application, which resides in one or more operator workstations, enables users to create or change process control modules and download these process control modules via a data highway to dedicated distributed controllers. Typically, these control modules are made up of communicatively interconnected function blocks, that are objects in an object oriented programming protocol and perform functions within the control scheme based on inputs thereto and provide outputs to other function blocks within the control scheme. The configuration application may also allow a designer to create or change operator interfaces or human-machine interfaces (HMI) which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, a maintenance view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure, monitor, and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable managers, engineers, or business and maintenance personnel to view the functioning state of hardware devices and various areas within the process plant, to enable simulation of the process plant, etc.

A configuration engineer may use a graphical display creation application to create one or more displays for operators, maintenance personnel, etc. within the process plant by selecting and building display objects in the display creation application. These displays are typically implemented on a system wide basis in one or more of the workstations and provide preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc. However, these displays are generally preconfigured to display, in known manners, information or data received from the process control modules or the devices within the process plant. In some systems, displays are created by a graphic depiction that represents a physical or a logical element and that is communicatively tied to the physical or logical element to receive data about the physical or logical element. The graphic on the display screen may change in real-time and in response to certain events, such as received data to illustrate, for example, that a tank is half full, to illustrate the flow measured by a flow sensor, the position of a valve, the temperature of a reactor, etc.

Typical operator and simulation displays include highly detailed information for the operator to view and assess a particular area of the process control system in general, and the various components that make up the area, specifically. For example, a reactor operator of a power plant may view a reactor operator display, while a turbine operator of the same power plant may view a turbine operator display. Because the operator must have complete control over the various components that make up the area of the process plant to which he or she is assigned, these operator displays are necessarily extremely detailed in order to facilitate such control.

Different types of process plant personnel may also be interested in certain steps of the process or various components within an area of the process plant. For example, an operator supervisor that manages personnel or resources for an area of the process plant that includes several different types of equipment and operators may be interested in the collective status of his or her managed portion rather than the status of each, individual component of the portion. Likewise, maintenance personnel may be interested in knowing the operational status of one or more components of the process plant that have a history of malfunctions, have just been replaced, or have been operating erratically. Further, engineers associated with designing and monitoring higher-level functions of a process control system may desire to selectively monitor various portions or areas of the system, or steps of the process itself to determine if changes may be required.

However, because of the level of detail required to be included in typical operator displays, as briefly described above, such displays may provide an undesirable level of detail to managers, maintenance personnel, and other users who are involved with the process control plant at a level other than operator. Typically, personnel other than operators require much less information regarding the portions of the process plant that are under their supervision or management and an operator display may be too complicated or unwieldy to such personnel. Further, while individual displays may be configured for each type of personnel associated with the process control system, configuring numerous displays for each type of employee may be time consuming and difficult. Moreover, because a configuration engineer or other specialist is required to design and implement each display, creating custom displays for all managers, engineers, business personnel, and other non-operator users associated with a process control system would be virtually impossible.

Thus, while typical operator displays for controlling the various components of a process control plant may be appropriate and necessary for plant and process operators, these operator displays may provide an undesirable level of detail for plant personnel other than operators. The intricate and informative detail of an operator display may be confusing or unnecessary for an average business manager (rather than an operations manager) or maintenance personnel who only require a basic knowledge of business or maintenance information related to the process control system. Further, creating a custom graphic display for each process control system or plant non-operator user and employee may be impossible or impractical.

SUMMARY OF DISCLOSURE

A "sidebar" on a computer display within a process control environment may provide a group of several small applications to allow business managers, engineers, maintenance personnel, or other non-operator personnel to organize and manage process control system information and to display selected diagnostics and summary information or "key operating parameters" for the process control system. Further, sidebar applications may communicate with other applications that are executing on a non-operator user's workstation to, thereby, retrieve information related to tasks that the user is currently completing. The sidebar application may then determine whether certain process control information may be useful for the main task the user is completing and display that process control information within the sidebar. For example, a non-operator user may view information in a main application and the sidebar application may present supporting summary information as appropriate, in a secondary application and display. The summary information may be related to a condition of the local computer and/or other nodes that are in the process control system. Further, sidebar applications may summarize devices that are reporting problems that may not affect device operation, but may need to be reported for maintenance. Sidebar applications may also maintain a list of other users on the process control system to enable communication between those other users. The sidebar applications may also access current values and historic trends to allow monitoring aspects of the process control system that are not currently being viewed within the main display by the user.

In one embodiment, a process control management system controls and manages a plurality of devices operating within a process control plant. The system may include a process control plant with a functional area and a plurality of controllers that may implement a control strategy of the process control management system. Each of the controllers may be communicatively linked to a device of the process control plant and the device may include an operating parameter that produces operating parameter data. The system may also include a workstation computer with a processor, a memory, and a graphic display showing a real-time graphical representation of the process control plant. The workstation may include a sidebar routine maintained in the workstation's memory and executed on the processor to present a graphical user interface with the graphic display. The sidebar routine may then be communicatively linked to the device through an interface and the graphical user interface may display the operating parameter data. Furthermore, the displayed operating parameter data may be selected from the graphic display either automatically or by direct user selection and interaction with the graphic display.

In a further embodiment, a computer-readable medium having computer-readable program code embodied therein may be adapted to be stored on a memory and executed on a processor to implement a "sidebar" graphical user interface in a process control system for use in a process plant. The graphical user interface may be configured to display a real-time representation of the process control system including a plurality of devices each including an operating parameter and producing operating parameter data. The graphical user interface may determine a key operating parameter from the plurality of devices and associate the key operating parameter with a sidebar application of the graphical user interface. The sidebar application would then summarize the key operating parameter and display the summarized key operating parameter within a secondary display of the sidebar application.

In a still further embodiment, a sidebar application for use in a process control management system of a process plant may include instructions stored in a computer-readable memory and executed by a processor of a process control management workstation to display summary and management information within a graphic display of the system. The graphic display may also include a real-time visual representation of the process control system and the process plant. To display the summary information, the sidebar application may be configured to select an item from the graphic display (the item including a reference to a data interface of an operating parameter of the process control system) and associate the selected item with one or more gadget applications of the sidebar application, wherein each gadget application is a child of the sidebar application. Once associated, the sidebar may access the operating parameter data interface through the reference of the selected item and cause operating parameter data to be received at the gadget application associated with the selected item. Once the data is received, the gadget application may then display operating parameter data of the selected item associated with the one or more gadget applications, where the operating parameter data may be generated by the process control system in real-time.

BRIEF DESCRIPTION OF THE DRAWINGS

FIG. 3b is a graphic display of a typical non-operator workstation of the process control system including banners to assist the non-operator in displaying information associated with the process control management system and the process control plant;

DETAILED DESCRIPTION

Figure 1:
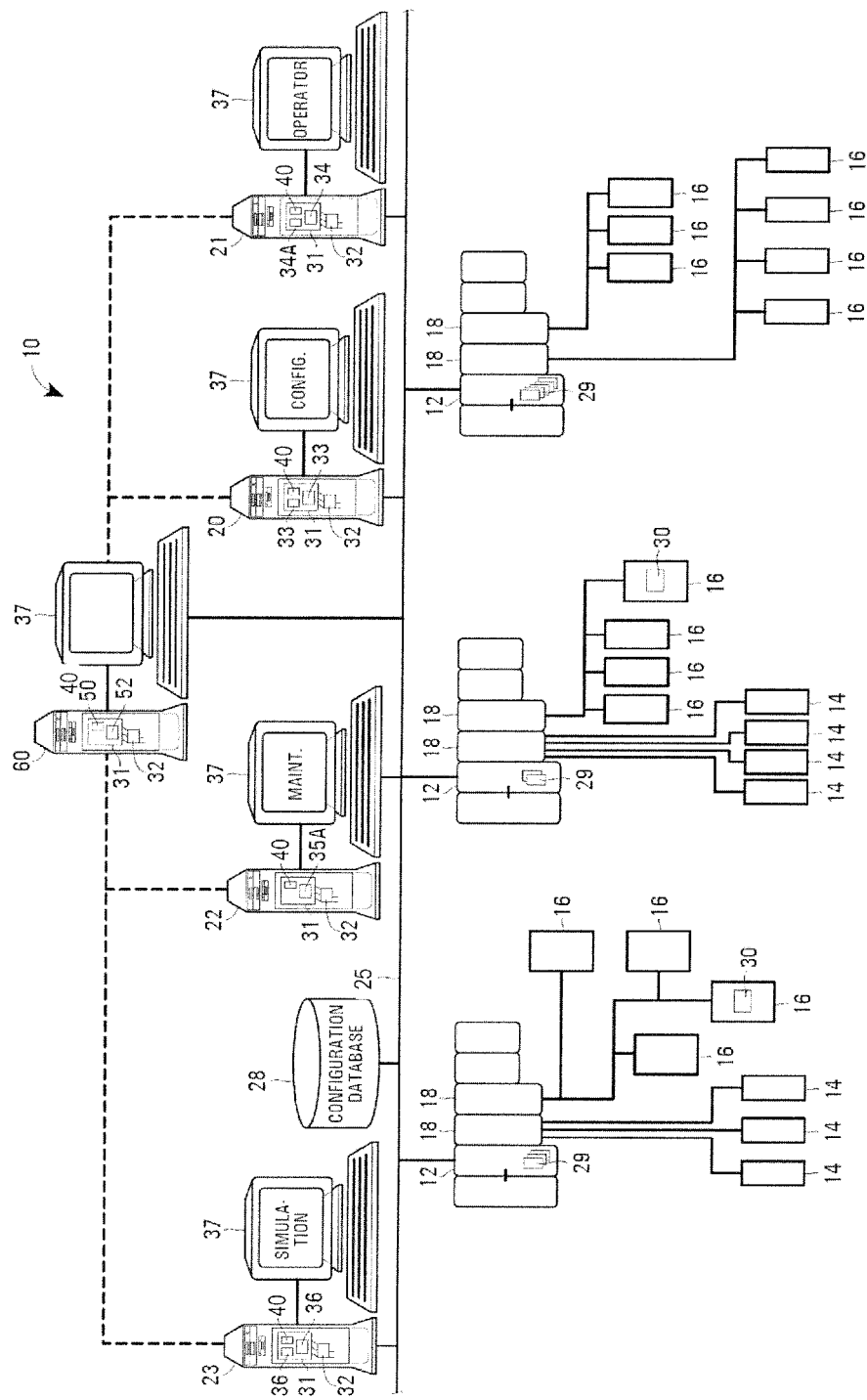
FIG. 1 is a block diagram of a distributed process control network located within a process plant including workstations that implement display routines including sidebar applications and other applications associated with various functions within the process plant.

FIG. 1 illustrates an example process plant 10 in which system level graphical support is provided to various functional areas of the plant 10. As is typical, the process plant 10 includes a distributed process control system having one or more controllers 12, each connected to one or more field devices or smart devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20-23 via a data highway 25 which may be, for example, an Ethernet link. A database 28 may be connected to the data highway 25 and operates as a data historian to collect and store parameter, status and other data associated with the controllers and field devices within the plant 10 and/or as a configuration database that stores the current configuration of the process control system within the plant 10 as downloaded to and stored within the controllers 12 and field devices 14 and 16. The database 28 may additionally store graphical objects to provide various graphical representations of the process plant 10. While the controllers 12, I/O cards 18 and field devices 14 and 16 are typically located down within and distributed throughout the sometimes harsh plant environment, the operator workstations 20-23 and the database 28 are usually located in control rooms or other less harsh environments easily assessable by controller, maintenance, and various other plant personnel. However, in some cases, handheld devices may be used to implement these functions and these handheld devices are typically carried to various places in the plant.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique. Each of the controllers 12 may also support the AMS® Suite of applications and may use predictive intelligence to improve availability and performance of production assets including mechanical equipment, electrical systems, process equipment, instruments, field and smart field devices 14, 16, and valves.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstations 20-23 may include various applications that are used for various different functions performed by the same or different personnel within the plant 10. Each of the workstations 20-23 includes a memory 31 that stores various applications, programs, data structures, etc. and a processor 32 which may be used to execute any of the applications stored in the memory 31. In the example illustrated in FIG. 1, the workstation 20 is designated as a configuration workstation and includes one or more configuration applications 33 which may include, for example, control module creation applications, operator interface applications and other data structures which can be accessed by any authorized configuration engineer to create and download control routines or modules, such as the control modules 29 and 30, to the various controllers 12 and devices 16 of the plant 10. The workstation 21 is generally illustrated in FIG. 1 as a control operator viewing workstation and includes a number of display applications 34 which may provide a control operator with various displays during operation of the process plant 10 to enable the operator to view and control what is happening within the process plant 10 or in various sections of the plant. The applications 34 may include support applications 34a such as control diagnostic applications, tuning applications, report generation applications or any other control support applications that may be used to assist a control operator in performing control functions. Similarly, the workstation 22 is illustrated as a maintenance viewing workstation and includes a number of maintenance applications 35 that may be used by various maintenance personnel to view the maintenance needs of the plant 10, to view the operating or working condition of various devices 12, 14, 16, etc. Of course, the applications 35 may include support applications 35a such as maintenance diagnostic applications, calibration applications, vibration analysis applications, report generation applications or any other maintenance support applications that may be used to assist a maintenance person in performing maintenance functions within the plant 10. The workstation 23 is indicated as a simulation workstation which includes a number of simulation applications 36 that may be used to simulate operation of the plant 10 or various sections of the plant 10 for any number of purposes, including for training purposes, for plant modeling purposes to assist in plant maintenance and control, etc. Each of the workstations 20-23 may also include a sidebar application 40 for organizing and managing one or more small applications to present diagnostics and summary information regarding the state of the process system to the user, as further explained below.

Of course, while the various configuration, control, maintenance, simulation, diagnostic and summary applications 33-36 and 40 are illustrated in FIG. 1 as being located in different workstations dedicated to one of those functions, it will be understood that the various applications 33-36 and 40 associated with these or other plant functions may be located in and executed in the same or different workstations or computers within the plant 10, depending on the needs and set up of the plant 10. Thus, for example, one or more simulation applications 36 and control applications 33 may be executed in the same workstation 20-23, while different individual simulation applications 36 or different individual control applications 33 may be executed in different ones of the workstations 20-23.

Figure 2:
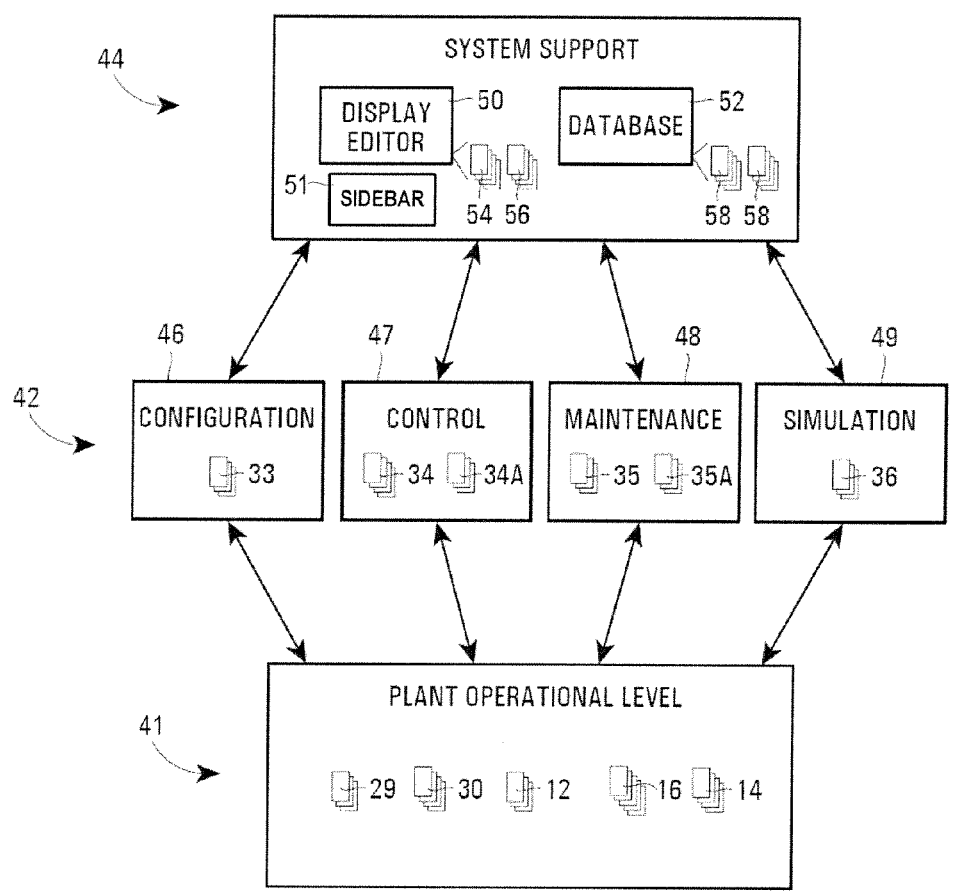
FIG. 2 is a logical block diagram illustrating the integration of system level graphical support within a process control management system.

FIG. 2 is a block diagram illustrating a representation of the various levels of a process control plant. A graphical support layer is provided at a system level 44 of the process plant 10 to support the graphic display and data structure needs of each of the various functional areas of the plant 10, including the configuration, operator viewing, maintenance viewing, simulation, business, and other functional areas of the plant 10. This system level 44 of support is depicted diagrammatically in FIG. 2, which illustrates a plant operational level 41, a plant functional level 42 and a system level 44. As will be understood from FIG. 2, the plant operational level 41 includes the controllers 12, field devices 14, 16, etc. which execute the control routines or modules 29 and 30, as well as other software that is run within the plant 10 to implement plant operations during runtime of the plant. The plant functional level 42 is depicted as including a configuration function block 46, a control function block 47, a maintenance function block 48 and a simulation block 49, although other or different functions, such as an engineering and a business function or a sidebar application function block, could be provided as well. The configuration function block 46 implements the configuration routines 33 which interface or communicate with components within the plant operational level 41 to provide control strategies or control modules thereto. The control function block 47 includes the control viewing and other applications 34 and 34a which also interface or communicate typically directly with the various physical and logical components within the plant operational level 41 to implement operator initiated changes within the plant 10, to provide information to the operator via control displays 34, to acquire data for the control applications 34a, etc. The maintenance function block 48 includes the maintenance routines and applications 35 and 35a that interface or communicate with various physical and logical components within the plant operational level 41 to implement maintenance procedures, to collect maintenance data, to provide maintenance data or information to a maintenance person via maintenance displays 35, to run diagnostic applications 35a, etc. Likewise, the simulation function block 49 includes simulation routines 36 which implement simulations of the plant 10 and which may be communicatively coupled to components within the plant operational level 41 to obtain data regarding the plant 10.

As illustrated in FIG. 2, the system level support layer 44 ties into and supports each of the function blocks 46-49 within the plant functional layer 42 to enable, for example, the creation and maintenance of common database and display structures, such as software objects, composite shapes and graphic displays for use in the various functional areas 46-49. More particularly, the system level support layer 44 includes application, database and graphical support elements that enable the graphical activities performed in each of the function blocks 46-49 to be integrated together, or to be developed using common database structures and composite shapes created at the system support layer 44.

The system support layer 44 may include a graphical editor 50, a sidebar application 51, and a graphical object database 52. The graphical editor 50 may be used to create composite shapes 54 and graphic displays 56, while the graphic object database 52 stores the composite shapes 54 and displays 56 in a memory accessible by the editor 52 and by the various applications in the blocks 46-49. The sidebar application 51, as further described below, may provide a toolbar, overlay, or other suite of "gadget" applications in communication with various process control system components, field devices 14, 16, etc., for a graphic display 56. In one embodiment, the sidebar application 51 provides customizable situational awareness for system users in positions above the typical operator level. The sidebar application 51 may also communicate with each component of the support layer 44, functional layer 42, and operational layer 41 to provide a conduit through which data from each layer 44, 42, and 41, may be passed between users and workstations (e.g., workstations 20-23) at all levels. The database 52 may also store various objects 58 for use by the graphical editor 50 and sidebar 51 applications, or other system level support layer 44 applications including sub-elements for composite shapes 54, and data structures that link the objects to individual hardware and software elements within the plant operational level 40. Additionally, the database 52 may store templates, sub-elements, and primitives that may be used to create further sidebar applications, composite shapes, or displays. As will be understood from FIG. 2, the graphic display elements 54, displays 56 and other database structures 58 may be used by any and all of the functional blocks 46-49 to create and use sidebar applications and graphics associated with those functional blocks.

Generally speaking, the system level support layer 44 facilitates a user's ability to tie into data associated with the equipment being displayed in graphical displays associated with the various areas, sub-systems, and components of the process control system, and to allow a user to summarize that data in one or more sidebar applications, as described below. As will be understood, the system level support layer 44 may be used to provide graphics and database support for multiple applications in each of the functional areas 46-49, for different applications in different ones of the functional areas 46-49, etc.

Referring in to FIG. 1, the system level support layer 44 may be implemented using one or more additional workstations 60 or user interfaces which may be connected to each of the other workstations 20-23. The workstation 60 may generally include supervisor, management, maintenance, or other non-operator applications including a sidebar application 51, the graphics editor 50, database 52, and other elements 54, 56 and 58, if so desired. Additionally, the workstation 60 may be communicatively connected to the workstations 20-23 via the databus 25, via separate wired or wireless communication connections (illustrated by dotted lines in FIG. 1) or in any other desired manner. In the configuration illustrated in FIG. 1, the workstation 60 may execute the suite of "gadget" applications within the sidebar application 51 to allow a user to configure the sidebar application 51 to display various process control system data from various functional areas, sub-systems, devices 14, 16, and other components of the process control system. In one embodiment, a user may view a real-time visualization of the process control system within a graphic display and "drag and drop" various items (e.g., areas, components, devices, etc.) illustrated within the graphic display to a sidebar application 51. Various operating parameters of the selected items may then be monitored in real-time by the user. The configured sidebar application 51 may be then stored in the database 52 to be accessed and used by various functional blocks 46-49 illustrated in FIG. 2, implemented on the various workstations 20-23 or other workstations 60. While, for the sake of illustration, the functionality of the system level block 44 and the function level blocks 46-49 is illustrated as being implemented on different or separate workstations 20-23 and 60 in FIG. 1, it will be understood that any or all of the applications associated with any of these various blocks could be implemented on the same or different workstations or other computers within or associated with the process plant 10. Thus, the sidebar application 51 may be stored in and executed on any of the other workstations 20-23 and 60 or on any other computer associated with the plant 10 and need not be in a stand-alone or separate computer.

As discussed above, the system level layer 44 of FIG. 2 implements system level display and database objects, which can be used in a variety of the functional environments as well as to provide higher level display capabilities. Generally speaking, the display objects created at the system level 44 of FIG. 2 can be categorized as composite shapes and graphic displays. Composite shapes are generally display objects that are associated with a particular physical entity within the plant, such as a hardware device like a valve, a sensor, a pump, a controller, a tank, a reactor, a burner, a pipe, a pipe fitting, etc. Graphic displays are generally made up of a set of interconnected composite shapes and are used to represent and model more complicated sets of hardware within a plant, such as a unit, an area, a device, etc., and include interconnections between different hardware units. Composite shapes may be made up of a plurality of sub-elements that may, themselves, be composite shapes. In other words, the composite shapes 74 may be nested. For example, a tank composite shape within a reactor graphic display may include one or more composite shapes of valves, pipe fittings, sensors, an agitator, etc., that are each made up of rectangles, ellipses, lines, etc. Likewise, the graphic displays may include one or more composite shapes, as well. Additionally, graphic displays may include graphs, charts and other data provided from the plant, from other applications, such as diagnostic and business applications running in the workstations 20-23 and 60, etc. As discussed further below, a user viewing a graphic display may select and drop any of the units, areas, devices, composite shapes, etc., from the graphic display into the sidebar applications 51 or a specific gadget of the sidebar application and view and manage the data communicated (from the controller 12 or actual device 14, 16, unit, area, etc. of the system, to the selected item) and displayed within the sidebar application 51.

Figure 3A:
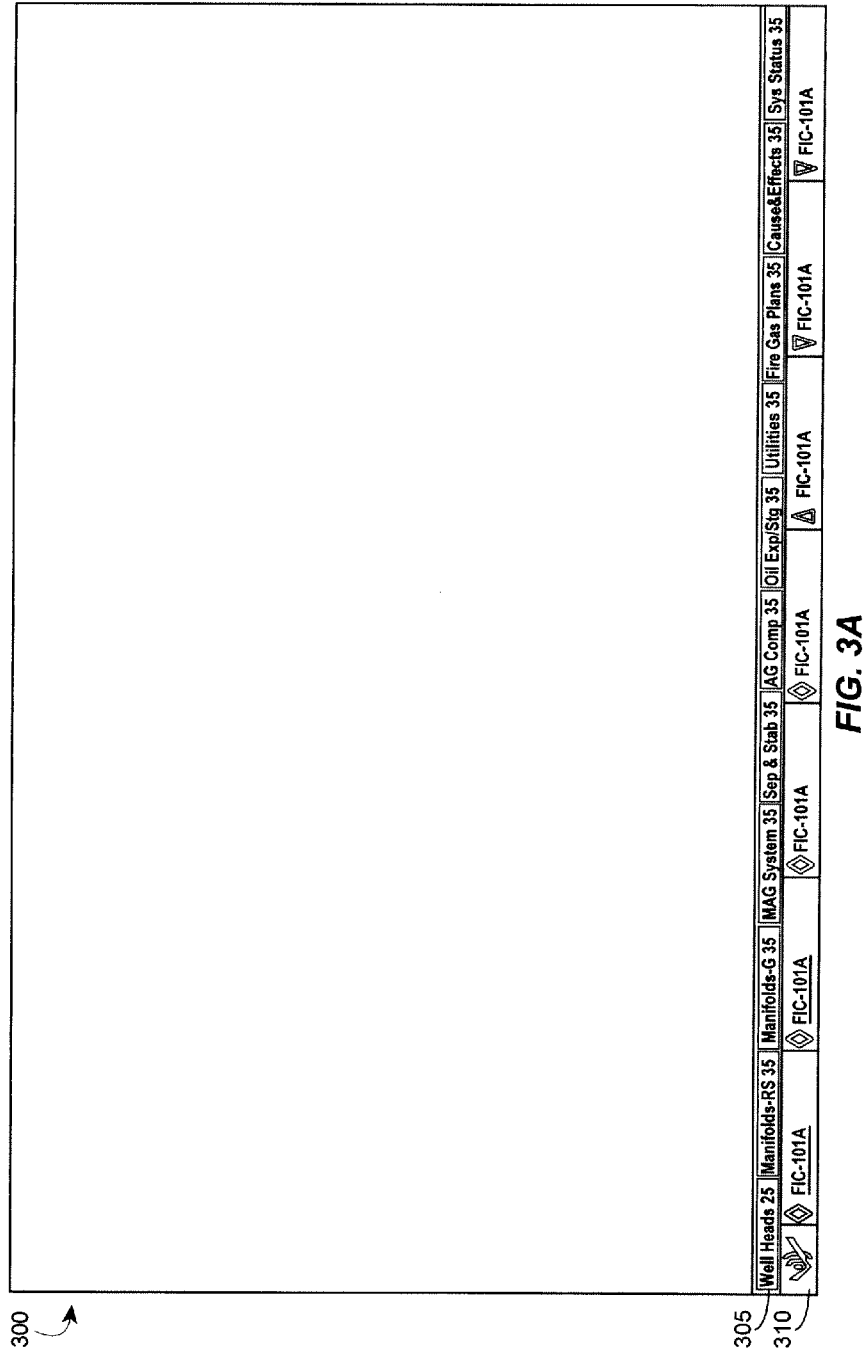
FIG. 3a is a graphic display of a typical non-operator workstation of the process control system including one or more navigation banners and alarm banners.

FIG. 3a generally illustrates a graphic display 300 of a typical non-operator workstation of the process control system including one or more banners that a user may select to display various information about the process control plant 10 within the graphic display 300. In one embodiment, the graphic display 300 includes one or more navigation banners 305 and one or more alarm banners 310. A navigation banner 305 may include one or more user-selectable tabs to display real-time graphical representations of various areas and sub-sections of the process control plant 10 (e.g., for a petroleum processing plant, a well heads tab, a manifolds tab, a MAG [a location designator] system tab, etc.). An alarm banner 310 may include one or more user-selectable tabs to display one or more messages, names of field devices 14, 16, control module names, or other information indicating that one or more portions of the plant are operating outside of desired parameters. In some embodiments, the tabs within the alarm banner 310 may display a visual indicator (e.g., change to a different color, flash, etc.) that the user should take action related to the performance of the item related to the alarm. As generally illustrated by FIG. 3b, a malfunctioning control module indication 312 may be selected to display additional alarm information 314. In some embodiments, the additional alarm information 314 may indicate a type of affected device 14, 16, an affected device name, an error title, and a time of the malfunction. Of course, other types of information such as a physical location, a duration of the alarm, a severity of the malfunction, may also be displayed. The tabs within the navigation banner 305 may initially display a name or other information-related visual indicator (e.g., change to a different color, flash, etc.) that the user should take action related to the performance of the item related to the alarm.

Figure 3C:
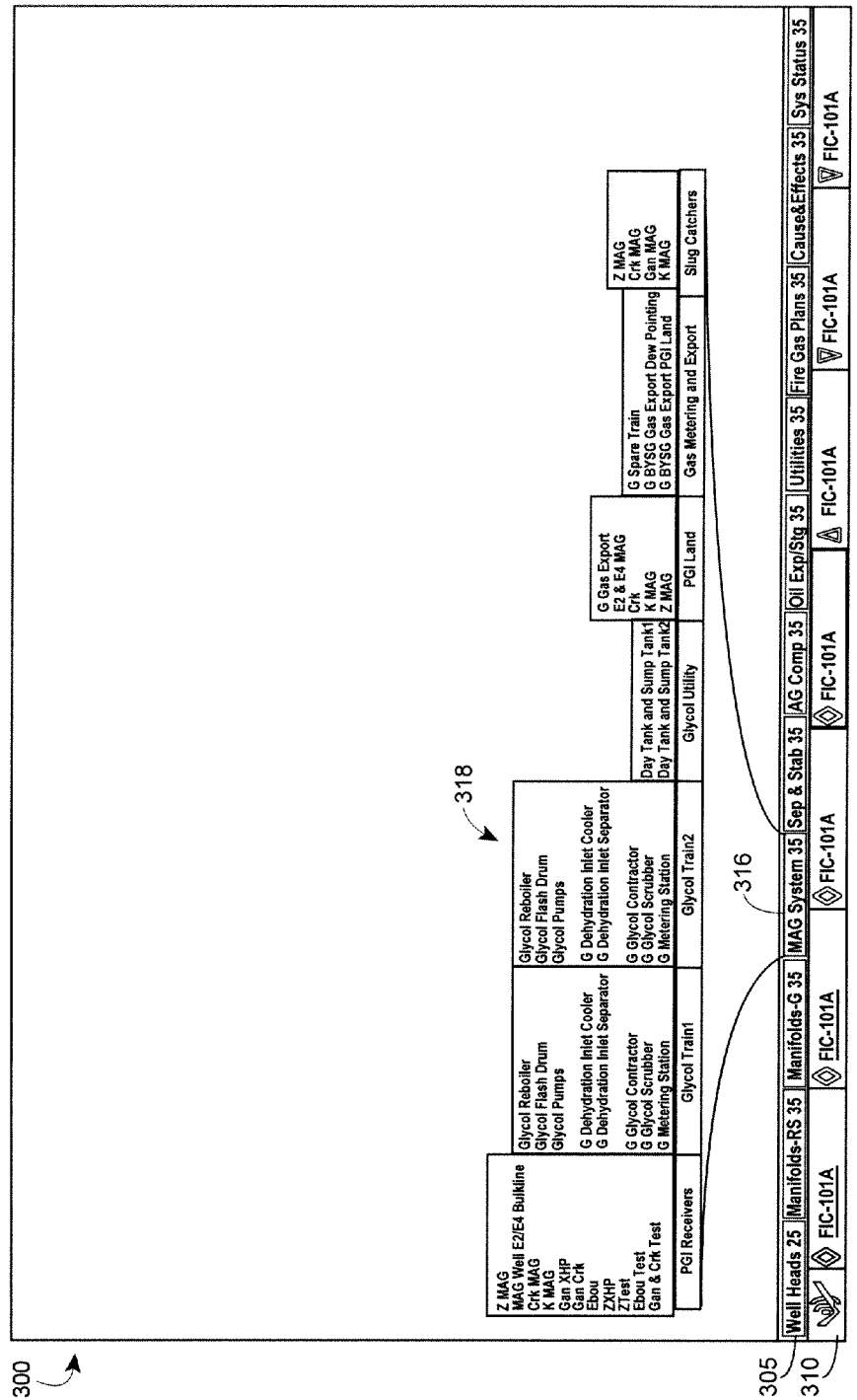
FIG. 3c is a graphic display of a typical non-operator workstation of the process control system that displays a menu of sub-systems of the process control plant.
Figure 3D:
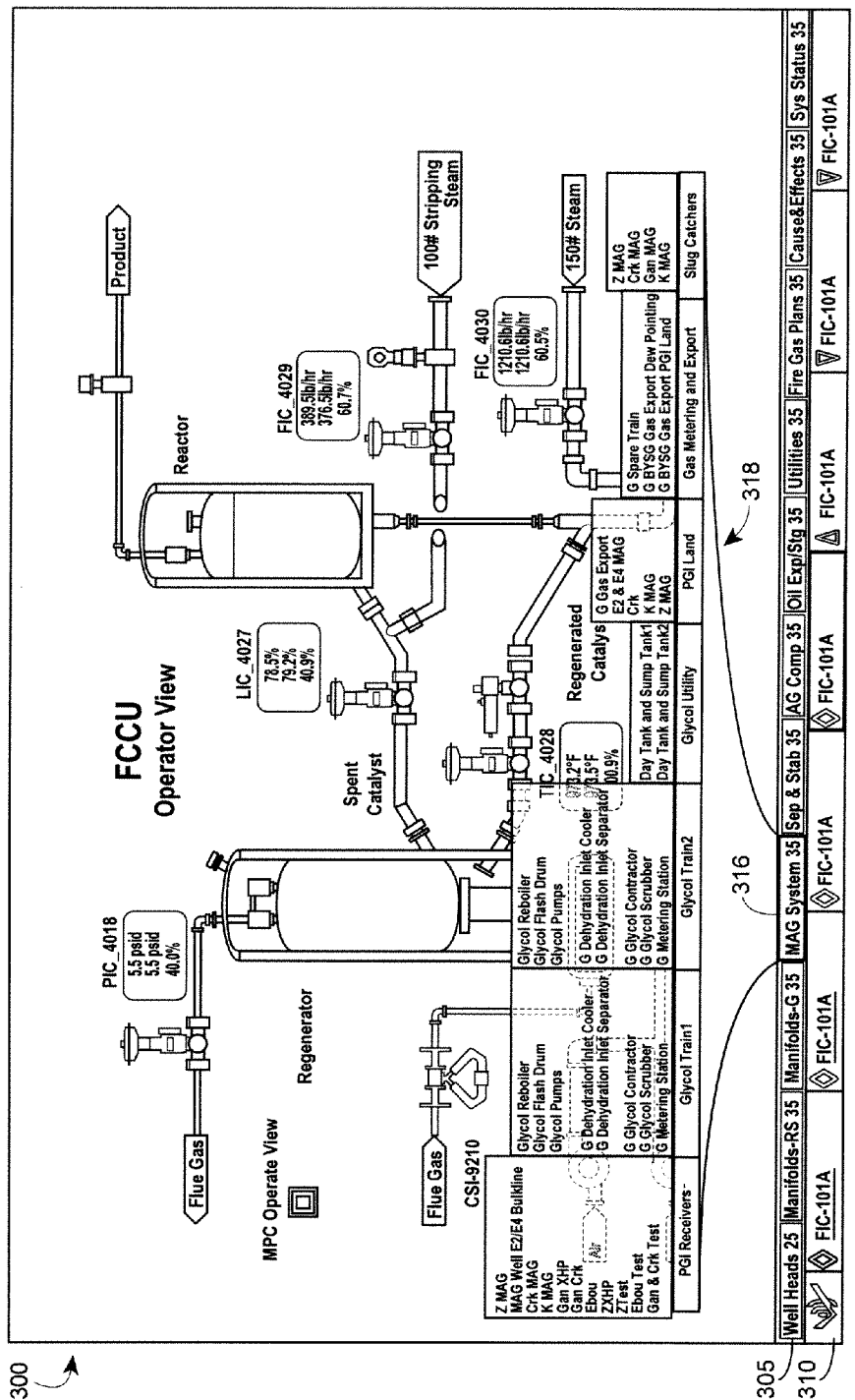
FIG. 3d is a graphic display of a typical non-operator workstation of the process control system displaying an area, sub-system, or other related components of the process control plant.

FIG. 3c generally illustrates a selected navigation tab 316 of the navigation banner 305. Upon selection of the tab 316, additional information about the sub-system or area of the process plant 10 associated with the selected tab 316 may be displayed within the graphic display 300. Different sections or sub-systems information 318 may be listed for further selection by the user. For example, in a petroleum refining plant, selection of a MAG system tab 316 from the navigation banner 305 may display each sub-system of the MAG system as sub-system information 318. As shown in FIG. 3c, each of the displayed sub-systems may also include additional sub-systems, areas, devices 14, 16, or components of the selected sub-system. The displayed sub-systems may also be selectable to display additional information about the item within the graphic display 300. In one embodiment, selection of either a tab 316 from the navigation banner 305 and/or selection of one of the items displayed within the sub-system information 318 may display a visual representation of the selected item within the graphic display 300. With reference to FIG. 3d, user selection of a tab 316 may cause the graphic display 300 to display a representation of a portion of the plant 10 that is most closely associated with the selected tab 316. Additionally (or alternatively), user selection of one or more of the items from the sub-system information 318 may also display a representation of the portion of the plant most closely associated with the selected item(s). For example, selecting the "G Glycol Contactor" alone from the "Glycol Train2" sub-system information 318 may cause the display 300 to only display the G Glycol Contactor and related systems or devices 14, 16. Selecting the "G Glycol Contactor," "G Glycol Scrubber," and "G Metering Station" from the "Glycol Train2" sub-system information 318 may cause the display 300 to display all three related systems and their related components, connections, and devices.

Figure 3E:
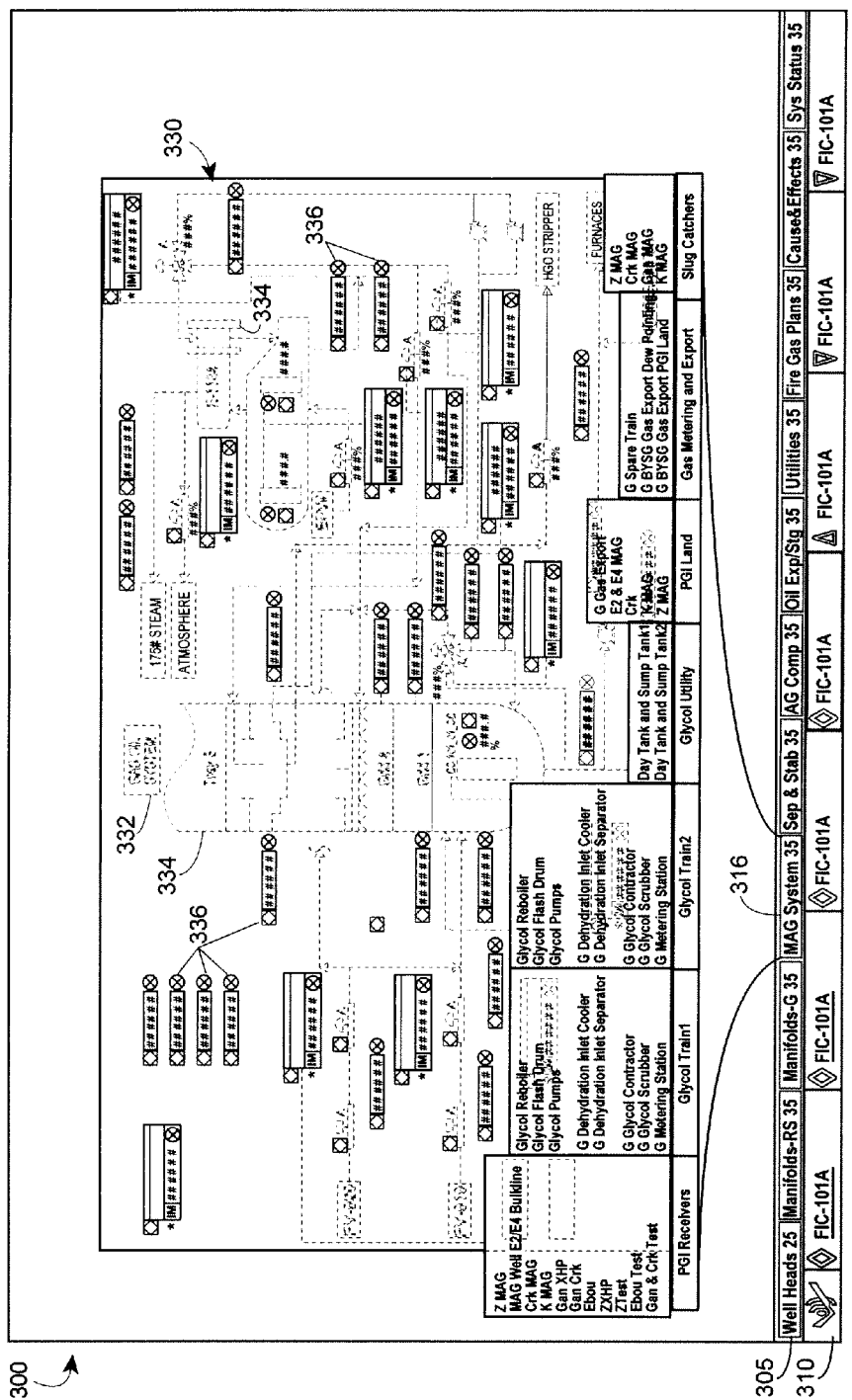
FIG. 3e is a graphic display of a typical non-operator workstation of the process control system displaying another area, sub-system, or other related components of the process control plant.

With further reference to FIG. 3e, user selection of one or more items from the banners 305, 310, tabs 316, and sub-system information 318 may cause the graphic display 300 to display a graphical representation of the unit, area, sub-system, or collection of devices 330. The area representation 330 may include one or more systems 332, that include one or more components 334, that further include one or more devices 14, 16 (such as device 336, as illustrated in FIG. 3e). The user may further select one or more of the systems 332, components 334, and devices 336 for examination or continued monitoring with a sidebar application, as described below.

Figure 3F:
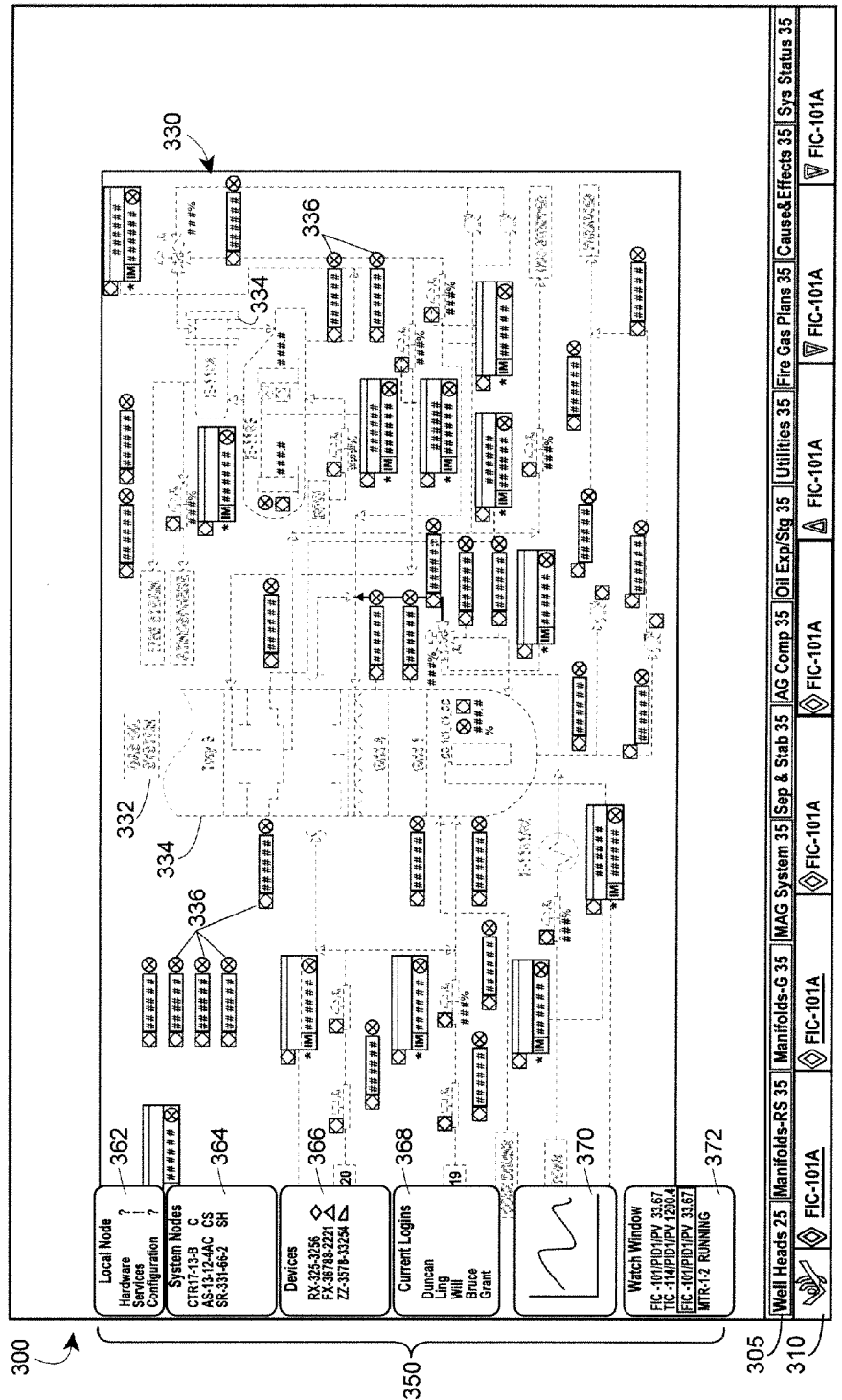
FIG. 3f is a graphic display of a typical non-operator workstation of the process control system displaying an area and related components of the process control plant and a sidebar area including several applications for summarizing conditions of the plant.

FIG. 3f generally illustrates a graphic display 300 including an area representation 330 and an interface for a sidebar application 350. While viewing the area representation 330, the user may use the sidebar application 350 to monitor or summarize real-time performance or other data of one or more of the displayed systems 332, components 334, and devices 336. In some embodiments, the sidebar application 350 provides several smaller applications, sidebar modules, or "gadgets" to display situational awareness at a level above that of an operator (e.g., maintenance personnel, engineers, business management, etc.) of the systems 332, components 334, devices 336, and other items within the plant 10. Some of the sidebar gadgets included with the sidebar application 350 may be designed to provide specific information about the items selected by the user. For example, the sidebar application may include one or more gadgets to display local node information 362, system node information 364, device information 366, user login information 368, trend information 370, and miscellaneous information 372. To monitor the information provided by the sidebar application 350, the user may select any of the one or more items from the area representation 330 and associate the selected item(s) with any of the gadgets 362-372 within the sidebar application 305. For example, the user may select and associate an item using a pointer control of a typical workstation, such as a mouse pointer, and a "drag and drop" method, as commonly known. Once associated with the sidebar application 350, summary and other data related to the selected item may be displayed to the user within one or more secondary displays of a gadget application, as further explained herein.

Any portion of the process or plant 10 that is shown to the user within the graphic display 300 may be dragged and dropped into the sidebar application 350 to display information related to the constituent parts of the selected portion. For example, a user may select a "high level" portion of the plant that includes numerous components, each with several devices such as valves, meters, monitors, etc., and several operator workstations or nodes that communicate with it (e.g., a reactor, a cracking unit, a boiler etc.). The user may drop the selected portion into a gadget of the sidebar application 350 to display one or more lower level categories of information from the selected portion. For example, the user may drop a high level portion that includes numerous devices and operator workstations into the devices gadget 366 to display the device information within the sidebar application, or into the system nodes gadget 364 to display information related to the workstations or nodes that are communicating with the selection. Once the selected portion is dropped into the sidebar application 350, one or more of the gadgets 362-372 may populate with the all of the data from the selected portion that matches the gadgets. Alternatively, dropping the selected portion into the sidebar application 350, may cause one or more menus to appear that are populate with the all of the data from the selected portion that matches the gadgets. The menus may permit a user to choose which operating parameters and device data he or she wishes to monitor from the sidebar application 350.

In some embodiments, the sidebar gadgets 362-372 may display specific, "key" parameters related to the item(s) associated with the gadget. These parameters may be selected by default or customized by the user to display information that is important to maintenance, engineering, business, and other non-operator personnel that are not required to have an intimately detailed view of the numerous systems, components, and devices of the plant 10, but may be interested in a few of the parameters of the plant 10. The gadgets 360-372 may display information that would convey to the user that a selected area or system of concern is functioning normally or abnormally, but would not immediately display more detailed information unless the user took steps to further select and refine the displayed information. For example, a product of the plant 10 may include a process that is completed in several distinct stages. While operators control every aspect of every stage of the process, a business manager may only be interested in how close the product is to completion, a maintenance manager may only be concerned with the function of a particular valve that has been behaving erratically or has recently been replaced, and an engineer may only be concerned with the overall positive or negative performance of a particular system or the process as a whole. In such cases, each of the business, maintenance, and engineering personnel, etc., may configure the sidebar application 350 to only display information about selected portions of the process without the detail that would be necessary for an operator. However, if the non-operator user wishes to investigate a monitored item further, the user may select one or more hyperlinks or hotlinks associated with the summary information shown within the gadgets 362-372 to display more detailed information about the item (i.e., the user may "drill down" to a desired level of detail about the displayed item).

As illustrated by FIG. 3f, the gadgets 362-372 may summarize and display a variety of information about the selected item that the user dropped into one or more of the gadgets. The following gadget descriptions are examples of the type of information that may be summarized and displayed, however, these descriptions do not limit the types of key parameters, as described above, that may be displayed by the sidebar application 350. Each gadget may include computer-executable instructions maintained in a computer memory and executed on a processor of the computer. Each gadget may comprise a child application of the sidebar (parent) application 350. As illustrated in FIG. 3f, each gadget 362-372 may include a display area in which selected data, as further described below, is displayed.

A local node gadget 362 may display information related to the particular workstation at which the user is viewing the graphic display 300. For example, a local node gadget 362 may display information about the workstation including a workstation hardware status, services currently being executed by the workstation, a configuration (e.g., hardware and/or software) of the workstation, etc.

A system nodes gadget 364 may display names and other information related to other workstations the user selects to monitor. The system nodes gadget 364 may display a node name and type (e.g., controller, controller supervisor, etc.), as well as illustrate any other general indications of node functionality. For example, a node name within the system nodes gadget 364 may be displayed in a particular status color (e.g., red or green) that indicates that the node is or is not functioning properly. The status color may be associated with one or more default or user-defined characteristics of the system node to determine the color. For example, a default or user setting may be that if the node is registered and communicating with the process control system, then the status color is green. However, if the node loses communication with the process control system, then the displayed status color is red. Of course, other characteristics of the plant 10 or the process control system may be associated with the system nodes gadget 364 to provide summary information to the user (e.g., whether a node is achieving a desired level of performance, has made a change to the plant or system, etc.).

A devices gadget 366 may be configured to display summary information for one or more devices 336 (e.g., valves, valve positioners, switches and transmitters that are displayed within the graphic display 300, or that may be a component of one or more devices or areas of the process control plant shown within the graphic display. Summary information for a device within the devices gadget 366 may include any information related to the selected device that the user wishes to see, for example, a device name, a device location, a status identifier, etc.

A current logins gadget 368 may be configured to display summary information for one or more logged-in users of the process control system. The logged-in users may include one or more of operators, managers, engineers, maintenance personnel, or any other personnel that may view a graphic display 300 or other real-time graphic representation of the process control system and plant 10. The summary information for each login may include a user name, a physical or network location, a status (e.g., busy, away, etc.), or a current activity (e.g., replacing a device, performing routine maintenance, inspecting an area, etc.).

A trend values gadget 370 may be configured to display summary information in the form of a line graph or other representation that shows a performance or other measure of any selected system component over a period of time. For example, a user may drag and drop a component 334 from the graphic display 300 into the trend values gadget 370. The display area of the trend values gadget may then show one or more performance values for the selected item over a period of time. Where the selected item includes more than one possible measure of performance, then the trend values gadget 370 may be configured to display one or more selected measures. Further, the period of time over which the performance trend of the item is illustrated may be configured to a longer or shorter period, as desired by the user. Of course, the trend values gadget 370 may also include one or more default settings for the displayed measure of performance and/or the period of time.

A watch window gadget 372 may be configured to display summary information for any unit, area, device 336, component, or other item selected from the graphic display. The watch window gadget 372 may be further configured to display summary information for selected items that the user wishes to monitor or track while viewing a graphic display associated with a different portion of the process control system and plant or while viewing another application, such as a word processing or other application that is generally unrelated to the process control system. In some embodiments, a user may drag and drop a first component 334, device 336, or other item from a first graphic display 300, into the watch window gadget 372. The gadget 372 may then display summary information for that first item. The user may then change the graphic display to a second graphic display that illustrates a representation of a second portion of the process control system or plant, and drag and drop a second component 334, device 336, or other item from the second graphic display into the watch window gadget 372 to display summary information for that second item, as well. The user may then switch from viewing the process control system to working with a word processing application. The watch window gadget 372 may then display summary information for both the first and second selected item, regardless of the graphic display 300 or any background application (such as a word processing application) the user is viewing or running. In other embodiments, the user may select various items for the watch window gadget 372 while viewing a particular graphic display 300. Then, anytime that user views the particular graphic display, the watch window gadget 372 may display summary information for the previously selected items related to the particular display.

Figure 3G:
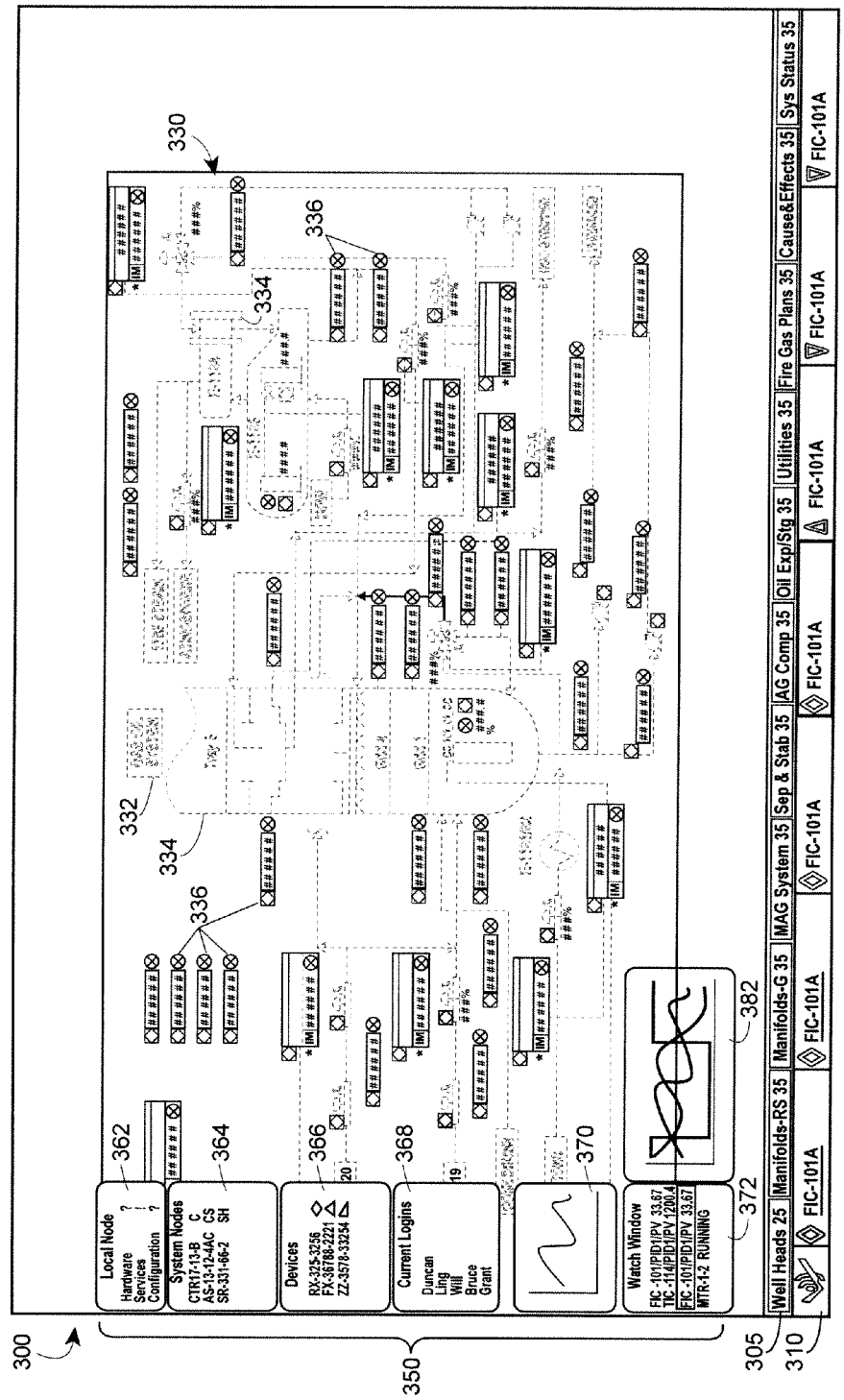
FIG. 3g is a graphic display of a typical non-operator workstation of the process control system displaying the sidebar area and an application of the sidebar for summarizing selected portions of the process control management system and process control plant.

With reference to FIG. 3g, any of the information displayed within any of the sidebar application 350 gadgets 362-372 may include further information that may be accessible to be displayed in a gadget secondary display 382 as the user selects it to "drill down" to other levels of detail, as described above. For example, the watch window gadget 372 may display the device name or other summary information for a particular item in the process control system or plant that the user has selected to watch. If the user desires further information about one of the selected devices, the user may select unite from within the watch window gadget 372 display (e.g., the device # FIC-101/PID1/PV 33.67) to cause the gadget to open a gadget secondary display 382 that shows further, more detailed information related to that particular device that was displayed in the main gadget. Each of the modules 362-372 may include a gadget secondary display 382 and further displays (e.g., a gadget tertiary, quaternary, etc., display) from which the user may "drill down" to increasing levels of detail about the displayed information. In some embodiments, the gadget secondary display 382 may illustrate a color-coded line graph comparing the performance of the selected device or other item over a period of time.

In further embodiments, user inaction such as failing to select an item from any of the banners 305, 310, tabs 316, or sub-system information 318, or failing to interact with the sidebar application 350, may cause the associated banner, menu, item, or displayed application to fade or otherwise disappear from the graphic display 300. Other user actions may cause the banner or items to re-appear, for example, moving a mouse cursor to an area of the graphic display 300 where the item was displayed before disappearing, selecting another menu, or other actions.

Figure 4:
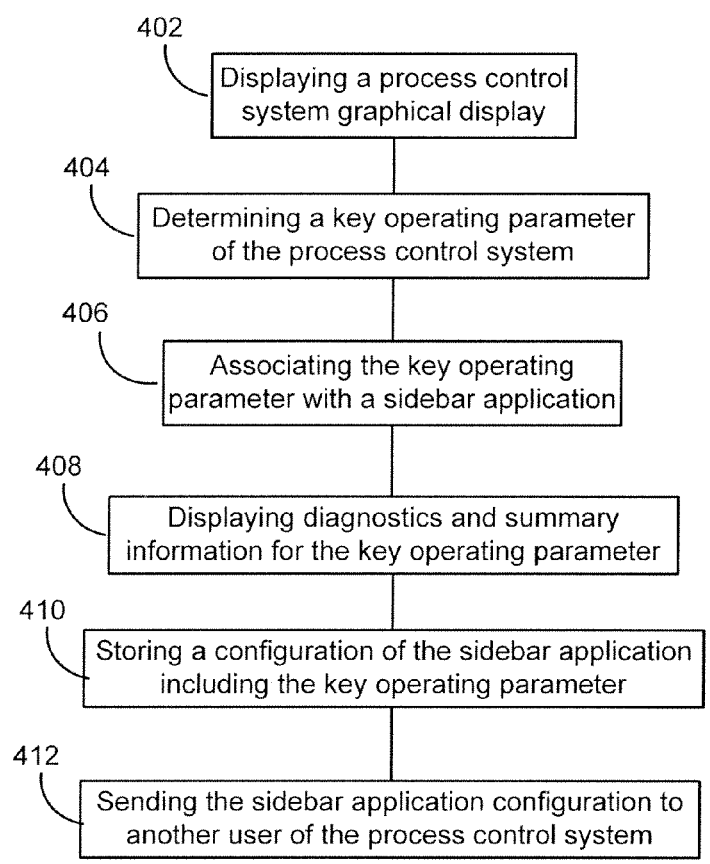
FIG. 4 is a block diagram illustrating one manner in which process control plant information and data may be summarized for a non-operator user using a sidebar application.

As illustrated by FIG. 4, the sidebar application 350 may include instructions in the form of a method 400, sequence of steps, or routines stored in a computer-readable memory that are able to be executed by a processor of a workstation or other computer of the process control system or plant to display the summary and management information within the various gadgets 362-372, as described above. At routine 402, the user may display a portion or a process control system, such as a device, component, or area as shown in FIGS. 3*d*-3*g*. In some embodiments, the user may be a user other than an operator that does not require a complex, detailed view of the process control system, but would benefit from monitoring certain "key parameters" of the process. At routine 404, the method 400 may determine one or more key operating parameters of the process control system. As briefly described above, a key parameter may be a some quantifiable portion of the process control system and plant. The key parameter may be selected automatically by the system or manually by a user. In some embodiments where the key parameter may be selected automatically, the method 400 determines what parameter(s) might be most important or interesting to the user according to one or more characteristics or the user. For example, the method may determine a key parameter based on the user's employment position, history of graphic display access, recent documents viewed or edited by the user, login information, current project assignment, or other related data that would indicate a particular interest in one or more key parameters of the system or plant. In other embodiments, the user may manually select the key parameter based on his or her personal interest in the system or plant. For example, the user may be a business manager interested in determining when the system completes a particular product so that he or she may initiate sales based on a real-time product ready date. Maintenance personnel may be concerned about the functionality of one or more areas, components, or devices within the system and, therefore, manually select one or more of those items for display within the sidebar application 350. Engineers may also be concerned about the functioning of a particular step in the process control system and manually select one or more items to monitor with the sidebar application.

At routine 406, the method 400 may associate the key parameter determined at routine 404 with one or more gadgets 362-372 of the sidebar application 350. As described above, the user may initiate routine 406 by dropping a selected item from the graphic display 300 into the sidebar application 350 generally or into one or more particular gadgets 362-372 of the application. For example, the user may select a component 334 of the graphic display 300, drag it to the sidebar application 350, and drop it in the general visual proximity of the application 350. The application 350 may then determine which of the various parameters of the selected component are able to be displayed within any of the gadgets 362-372 and display those parameters. Additionally or alternatively, the application 350 may be configured to query the user as to which parameters, if any, he or she desires to be displayed within one or more of the gadgets 362-372. The method 350 may associate the key parameter with a gadget 362-372 by accessing one or more data interfaces of the selected item. For example, each of the areas, components, and devices as shown within the graphic display may include a data interface for each of its key parameters. Therefore, when the user drags and drops the item from the graphic display into the sidebar application 350, the application 350 and/or one of the gadgets may access the appropriate data interface of the item and initiate a data communication session between the sidebar application and the data interface of the selected item using an appropriate data communications protocol. Of course, associating a key parameter with the sidebar application may also include any number of data transfer and access techniques as known in the art of process control system management, including wired or wireless data transfer, Fieldbus protocols, IEEE 802.* standards, BLUETOOTH (i.e., short range wireless communication), TCP/IP, Ethernet, etc.

At routine 408, the method 400 may display the data generated by a device 14, 16 or other process control system component that is associated with a key parameter within the sidebar application 350. As described above in relation to routine 406, the sidebar application 350 may access the data through one or more data interfaces of the selected item (e.g., area, component, device, etc.). Once received through the interface, the method 400 may then format and display the data communicated from the actual field device or other component within a gadget 362-372. Formatting the data may include accessing historical data of the selected key parameter and comparing the received, real-time data to the historical data to provide a time line or other visualization of the key parameter.

At routine 410, the method 400 may store a configuration of the sidebar application 350 or a configuration of one or more of the gadgets 362-372. In some embodiments, the configuration may include one or more references to the selected key parameter(s) as a sidebar configuration data file that may be stored on the workstation or other computing device that is executing the method 400 and the sidebar application 350. The sidebar configuration data file may also be instantiated by any compatible workstation executing process control system management software including the sidebar application 350. Upon instantiation, the sidebar application 350 may initiate a communication session with the one or more components or devices 14, 16 to retrieve and display real-time data within a gadget 362-372. At routine 412, the configuration file may be sent to one of more other users of the system. For example, the configuration file may be sent to any user that is currently logged on to the process control system, or any other authorized user of the process control system. Once the sent configuration file is received, it may be accessed by the sidebar application 305 on the receiving user's workstation to display an identical set of real-time key parameters.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control management system for controlling and managing a plurality of devices operating within a process control plant, the system comprising:
    a process control plant including a functional area and a plurality of controllers for implementing a control strategy of the process control management system, each of the controllers communicatively linked to a device of the process control plant, the device performing a process function of the control strategy and including an operating parameter corresponding to operating parameter data produced while the device performs the process function;
    a first workstation computer including a first display device, a first processor, a first memory and a first sidebar routine maintained in the first memory that, when executed on the first processor, causes the first workstation computer to:
        generate a first sidebar graphical user interface and a sidebar configuration data file, wherein the sidebar configuration data file associates the operating parameter data with the first sidebar graphical user interface and, wherein the first sidebar graphical user interface displays the operating parameter data within the first display device, and
        send the sidebar configuration data file to a second workstation computer;
    the second workstation computer including a second processor, a second memory, a second display device, and a second sidebar routine maintained in the second memory that, when executed on the second processor, causes the second workstation to:
        automatically receive the operating parameter data based on the sidebar configuration data file, and
        present a second sidebar graphical user interface simultaneously with a graphic display using the automatically received operating parameter data,
    wherein the second sidebar routine uses the sidebar configuration data file to:
        communicatively link the second workstation computer to the device of the process control plant through a controller interface of one or more of the controllers and the second sidebar graphical user interface,
        receive the operating parameter data of the device via the controller interface, and
        display the operating parameter data of the device regardless of what the graphic display is currently showing; and
    wherein the operating parameter data displayed within both the first sidebar graphical user interface and the second sidebar graphical user interface corresponds to the device of the process control plant performing the process function for the process control plant.

2. The process control management system of claim 1, wherein the first workstation computer generates the sidebar configuration data file based on particular interest data that is indicative of an interest of a user of the first workstation computer in viewing the operating parameter data.

3. The process control management system of claim 1, wherein each device includes either a field device or a smart device.

4. The process control management system of claim 1, wherein the device is either logically or physically within the process control management system.

5. The process control management system of claim 1, wherein the graphic display includes a graphical representation of the functional area.

6. The process control management system of claim 5, wherein the functional area includes one or more of configuration, operator viewing, maintenance viewing, simulation, and business management.

7. The process control management system of claim 1, wherein the sidebar routine includes a plurality of gadget applications, and the sidebar routine is a parent of each gadget application.

8. The process control management system of claim 7, wherein each gadget application includes a display area within the graphic display, each display area including a graphical representation of the operating parameter data.

9. The process control management system of claim 8, wherein the graphical representation of the operating parameter data includes a hyperlink to allow display of further data related to the operating parameter data.

10. The process control management system of claim 7, wherein each gadget application receives operating parameter data from one or more of a controller interface or a device interface.

11. The process control management system of claim 7, wherein one or more of the plurality of gadget applications is configured to display operating parameter data including local node information, system node information, device information, user login information, trend information and miscellaneous information.

12. The process control management system of claim 1, wherein the sidebar routine includes a sidebar configuration storage routine to store one or more references to the selected operating parameter data within a sidebar configuration file.

13. A non-transitory computer-readable storage medium having computer-readable program code embodied therein, the computer-readable program code adapted to be stored on a memory and executed on a processor to:
    perform a process function of a control strategy of a process control management system within a process control plant including a functional area and a plurality of controllers for implementing the control strategy, each of the controllers communicatively linked to a device of the process control plant, the device performing a process function of the control strategy and including an operating parameter corresponding to operating parameter data produced while the device performs the process function;
    generate, at a first workstation computer, a first sidebar graphical user interface and a sidebar configuration data file, wherein the sidebar configuration data file associates the operating parameter data with the first sidebar graphical user interface;

summarizing, at the first workstation computer, the operating parameter data using the operating parameter data;

display, at the first workstation computer, the summarized operating parameter data;

send, from the first workstation computer, the sidebar configuration data file to a second workstation computer;

automatically receive, at the second workstation computer, the operating parameter data based on the sidebar configuration data file;

display, at the second workstation computer, a second graphic display simultaneously with a second sidebar graphical user interface using the automatically received operating parameter data;

wherein a sidebar application at the second workstation computer uses the received sidebar configuration data file to:

communicatively link the second workstation computer to the device of the process control plant through a controller interface of one or more of the controllers and the second sidebar graphical user interface, receive the operating parameter data of the device via the controller interface, summarize, at the second workstation computer, the operating parameter data using the automatically received operating parameter data, and display the operating parameter data of the device summarized at the second workstation computer regardless of what the second graphic display is currently showing; and wherein the operating parameter data displayed within both the first sidebar graphical user interface and the second sidebar graphical user interface corresponds to the device of the process control plant performing the process function for the process control plant in real-time.

14. The non-transitory computer-readable storage medium of claim 13, wherein the operating parameter data summarized at the first workstation computer is displayed in response to particular interest data that is indicative of an interest of a user of the first graphical user interface in viewing the summarized key operating parameter.

15. The non-transitory computer-readable storage medium of claim 13, wherein each of the plurality of devices are either logically or physically within the process control system.

16. The non-transitory computer-readable storage medium of claim 13, wherein the sidebar application includes a plurality of gadget applications, wherein the sidebar application is a parent of each gadget application.

17. The non-transitory computer-readable storage medium of claim 16, wherein each gadget application is configured to display a secondary display area.

18. The non-transitory computer-readable storage medium of claim 17, wherein the operating parameter data displayed at the second workstation computer includes a hyperlink configured to display further data related to the operating parameter data.

19. The non-transitory computer-readable storage medium of claim 16, wherein each gadget application is configured to receive operating parameter data from one or more of a controller interface and a device interface.

20. The non-transitory computer-readable storage medium of claim 13, wherein the sidebar application includes a sidebar configuration storage routine configured to store one or more references to the operating parameter data summarized at the second workstation computer.

21. The non-transitory computer-readable storage medium of claim 13, wherein the sidebar routine at the second workstation computer further uses the received sidebar configuration data file to associate the operating parameter data summarized at the second workstation computer with the sidebar application when the operating parameter data summarized at the second workstation computer corresponds to a user characteristic, the user characteristic including one or more of a user employment position, a user history of graphic display access, a recent document viewed or edited by the user, a user login information, and a user current project assignment.

* * * * *